(No Model.)
E. A. CREPIN & F. ROCHAT.
GUN FOR DESTROYING ANIMALS.
No. 274,279. Patented Mar. 20, 1883.
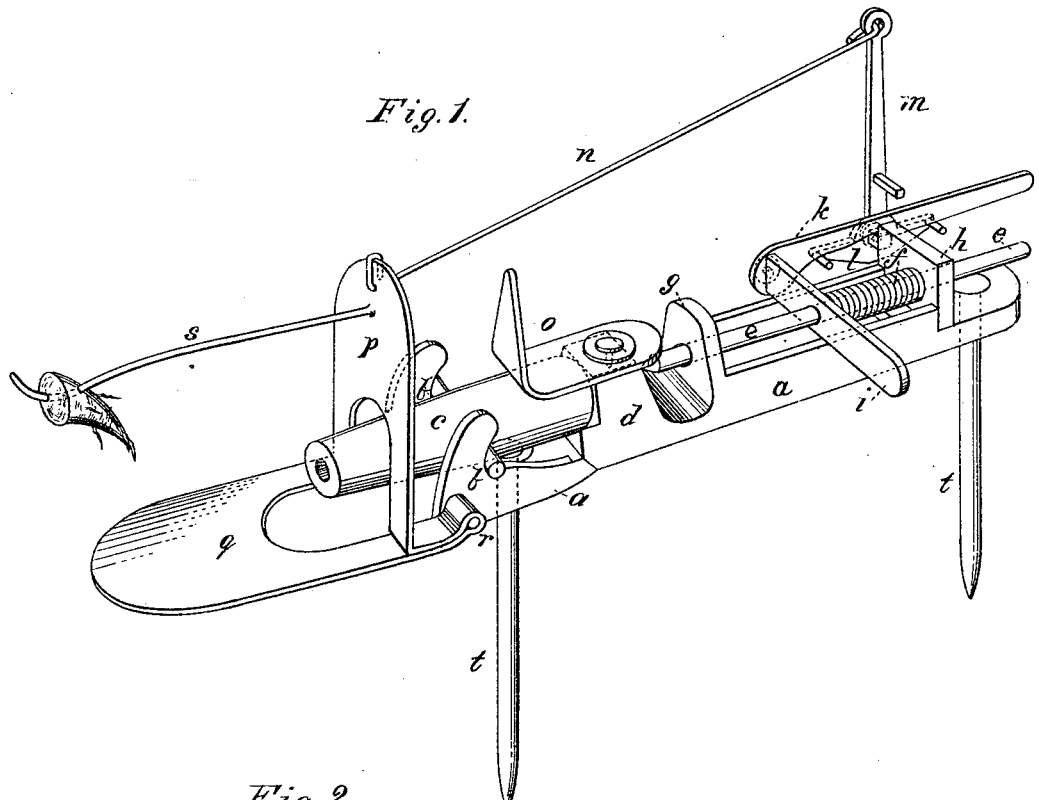
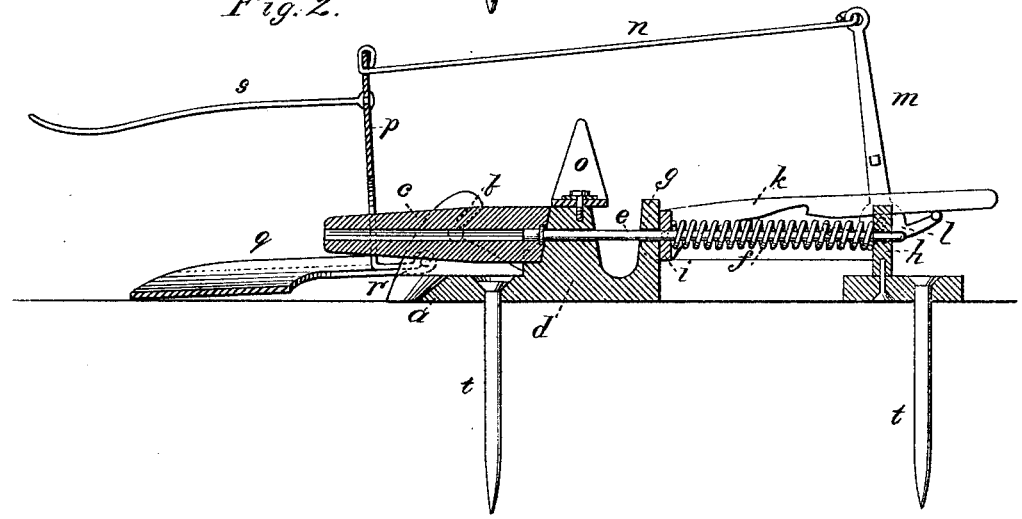
WITNESSES
Villette Anderson.
Simon Fennell
INVENTORS
Emile A. Crepin
François Rochat
By
J. A. Fullerton
ATTORNEY.

UNITED STATES PATENT OFFICE.

EMILE A. CREPIN AND FRANÇOIS ROCHAT, OF HOLLISTER, CALIFORNIA.

GUN FOR DESTROYING ANIMALS.

SPECIFICATION forming part of Letters Patent No. 274,279, dated March 20, 1883.

Application filed November 25, 1882. (No model.)

*To all whom it may concern:*

Be it known that we, EMILE A. CREPIN and FRANÇOIS ROCHAT, citizens of the United States, residing at Hollister, in the county of San Benito and State of California, have invented certain new and useful Improvements in Gopher-Cannons and Gun-Carriages; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is a device for the destruction of gophers and other burrowing animals injurious to agricultural products while under cultivation.

It consists of a small breech-loading cannon mounted by trunnions upon a carriage and discharged by means of a firing-pin with a helical spring operated by a lever or trigger, which is set in motion by the animal when nibbling at the bait, or even when approaching the muzzle of the gun and throwing dirt upon the spoon affixed to the front part of the carriage.

Figure 1 is a perspective view of the invention. Fig. 2 is a longitudinal section.

The carriage $a\ a$ is provided with bearings $b$, upon which is mounted a small breech-loading cannon, $c$, supported by its trunnions in the center and resting at its rear upon a ledge of the breech-piece $d$. This breech-block is pierced in the center to admit the play of the firing-pin $e$. A helical spring, $f$, is coiled around the rod of this firing-pin, which passes also through a head, $g$, and tail-piece $h$. The spring presses against this tail-piece at its rear end. A cross-bar, $i$, is affixed to the rod of the firing-pin at the forward end of the spring, and abuts against the head-piece $g$, stopping the forward motion of the rod when it has progressed forward far enough to strike and explode the cartridge. This cross-bar projects on the left beyond the frame of the carriage, and serves on this side as a finger-piece, by means of which the spring may be compressed against the tail-piece when the trigger is to be set. On the other end of the cross-bar is pivoted a notch-bar, $k$, which is also carried rearward when the spring is compressed, so that the notch will engage with the square neck projected on the right side of the tail-piece $h$ at the rear end of the carriage. The bar will at the same time rest on both points of the tumbler $l$ on the lower end of the trigger-arm $m$. This tumbler and trigger-arm are pivoted upon the projecting neck of the tail-piece. To the top of the trigger-arm is affixed a rod or wire or string, $n$, leading forward to an upright arm, $p$, standing over the muzzle of the cannon. This arm forms a part of the dirt-spoon $q$, which is pivoted by its shoulders $r$ to pins projecting from each side of the front part of the carriage, and rests horizontally in front of the muzzle of the cannon. To the upright arm is also affixed the bait-finger $s$, upon which may be placed a small piece of carrot, or any other temping morsel of which the animal may be fond. Upon the breech-piece is pivoted a flat button, $o$, which projects over the rear end of the cannon, and serves to hold it down, so that the bore of the gun will coincide with the aperture in the breech-piece for the passage of the firing-pin. When it is desired to load the piece, this button must be turned aside, so as to uncover the point of junction of the cannon and breech-piece. By slightly compressing the spring the firing-pin will be so far withdrawn from the bore as to permit the cannon to be tilted forward upon its trunnions, and the cartridge—we use a No. 22 cartridge—inserted in the rear end of the bore. The barrel can be lifted out of the carriage, if desired, to facilitate the act of loading. When loaded the cannon is replaced in the carriage and secured in its position by drawing over it the button.

Before setting the trigger the machine should be secured in the ground by driving the pins or stakes $t\ t$, projecting downward through the bottom of the body of the carriage, sufficiently deep to bring the muzzle of the cannon on a level horizontally with the center of the gallery made by the gopher. The trigger is then adjusted by drawing back the firing-rod and compressing the spring by means of the cross-bar $i$. This motion carries backward the bar $k$, the notch of which is then set on the square neck at the right side of the tail-piece $h$, the bar at the same time resting upon the points of the tumbler $l$ of the trigger $m$. This slightly raises the dirt-spoon in front of the carriage, so that it may stand horizontally with, but below the muzzle of, the cannon. When the animal nibbles at the bait, or if, in his approach, he throws dirt upon the spoon, so as to increase its weight, or otherwise depresses or raises it, the tumbler of the trigger will raise the notch-bar, and thereby release the spring and firing-pin and cause the projectile to be discharged into his body.

The implement has been designed with reference to the destruction of the gopher, but will be found also effective for killing rats or other predatory vermin. It may be made of any size, and the spoon and arm, with the string connecting them with trigger, omitted. The piece can then be fired when aimed by pushing the trigger-arm forward or pulling it toward the rear.

We claim as of our invention and desire to secure by Letters Patent—

1. The combination of the breech-loading cannon $c$, provided with trunnions, with the gun-carriage $a$, provided with the fixed breech-piece $d$, and firing-rod $e$, and coiled spring $f$, to be operated by means of the trigger $m$ and bar $k$, substantially as shown and described, and for the purposes set forth.

2. The gun-carriage provided with trunnion-bearings, breech-piece, and head and tail pieces, in combination with the trigger, firing-rod, and cannon, substantially as specified and shown, and for the purposes indicated.

3. The combination, in a gun-carriage, of the cross-bar $i$ and notch-bar $k$ with the firing-rod $e$, and coiled spring $f$, and head and tail pieces $g$ $h$, and trigger $m$, substantially as described and shown, and for the purposes set forth.

4. The combination of the spoon $q$ and its arm $p$, hinged upon the gun-carriage, with the rod $n$ and trigger $m$, substantially as described and shown, and for the purposes set forth.

5. The firing-rod $e$, provided with the fixed cross-bar $i$, pivoted notch-bar $k$, and coiled spring $f$, in combination with the square neck of the tail-piece $h$, and gun-carriage and cannon, substantially as described and shown, and for the purposes set forth.

6. The pivoted button $o$, in combination with the breech-piece $d$ and the cannon, substantially as described and shown, and for the purposes set forth.

7. The combination of the carriage and cannon and firing-rod and spring with the cross-bar $i$, the notch-bar $k$, the tail-piece $h$, tumbler $l$, trigger $m$, rod $n$, and arm $p$, substantially as specified and shown, and for the purposes set forth.

In testimony whereof we affix our signatures in presence of two witnesses.

EMILE A. CREPIN.
FRANÇOIS ROCHAT.

Witnesses:
B. H. STORR,
ANDREW JOHNSON.